United States Patent
Thurston et al.

[11] Patent Number: 5,884,665
[45] Date of Patent: Mar. 23, 1999

[54] AIR CONDITIONING REED VALVE SUPPORT SEAT

[75] Inventors: Michael Gordon Thurston, Buffalo; Kurt Ross Mittlefehldt, Amherst, both of N.Y.

[73] Assignee: General Motors Corporation, Detroit, Mich.

[21] Appl. No.: 81,152

[22] Filed: May 19, 1998

[51] Int. Cl.⁶ ............................................. F16K 15/16
[52] U.S. Cl. ........................ 137/856; 137/855; 251/359
[58] Field of Search ...................... 137/855, 856 O, 137/857, 858; 417/566, 569, 571; 251/359

[56] References Cited

U.S. PATENT DOCUMENTS

| | | | |
|---|---|---|---|
| 200,093 | 2/1878 | Sargent | 137/527.8 |
| 1,871,536 | 8/1932 | Bus | 137/527 |
| 2,370,247 | 2/1945 | Kenney | 137/527 |
| 2,537,099 | 1/1951 | Smith | 137/527.6 |
| 2,959,144 | 11/1960 | Youtie | 137/527 |
| 3,200,838 | 8/1965 | Sheaffer | 137/856 |
| 4,076,047 | 2/1978 | Akahori | 251/359 |
| 4,996,028 | 2/1991 | Danielsen et al. | 137/527.6 |
| 5,171,137 | 12/1992 | Todescat et al. | 417/571 |
| 5,345,970 | 9/1994 | Leyderman et al. | 137/856 |
| 5,380,176 | 1/1995 | Kikuchi et al. | 418/55.1 |
| 5,396,930 | 3/1995 | Ebbing et al. | 137/856 |
| 5,421,368 | 6/1995 | Maalouf et al. | 137/856 |
| 5,672,053 | 9/1997 | Sabha | 417/569 |
| 5,785,508 | 7/1998 | Bolt | 417/566 |

*Primary Examiner*—Denise L. Ferensic
*Assistant Examiner*—Joanne Y. Kim
*Attorney, Agent, or Firm*—Patrick M. Griffin

[57] ABSTRACT

An improved reed valve assembly for a compressor (10) includes a substantially annular reed tip support seat (36) which nonconcentrically surrounds a round discharge port (32). The radial width of the support seat (36) varies continually from a greatest width nearest the distal edge of the reed tip (24') to a least width diametrically opposed thereto. The greatest width is sufficient to support the reed tip (24') in the area where it needs the greatest support, but is narrower everywhere else, so as to reduce contact area, noise and opening resistance.

3 Claims, 2 Drawing Sheets

AIR CONDITIONING REED VALVE SUPPORT SEAT

TECHNICAL FIELD

This invention relates to automotive air conditioning systems in general, and specifically to an improved support seat for a reed-type, one-way refrigerant flow control valve.

BACKGROUND OF THE INVENTION

Automotive air conditioning compressors of either the piston or scroll type generally use reed-type, one-way refrigerant flow control valves, especially as discharge valves. A flat valve plate separates a gas compression chamber from a discharge chamber, with one or more round refrigerant discharge ports opening between the two. An elongated flat, spring steel reed has a base fixed to the valve plate and a tip overlaying the discharge port. Positive pressure forces the reed tip up and away from the valve plate surface to admit pressurized refrigerant vapor through the port and into the discharge chamber, but reverse flow is prevented as the reed snaps quickly back down over the port. A rigid, upwardly bent stop resting over the reed limits its opening height. The undersurface of the reed tip must make complete contact with the valve plate surface, all around the discharge port edge, in order to provide a good back flow preventing seal. However, it has been found that if the entire undersurface of the reed tip contacts the surface of the valve plate, it can tend to stick to the surface and not open quickly enough. Furthermore, the slapping noise of closing contact may be excessive. Therefore, it has been common practice for years to recess an annular channel concentrically around the port, greater in diameter than the reed tip, leaving a relatively narrow reed tip support seat surrounding the port.

Referring first to FIGS. 1 through 3, a typical example of the type of prior art discharge reed valve referred to above is illustrated. A compressor housing 10 has a compression space 12 segregated from a discharge chamber 14 by a flat discharge plate 16. A round, sharp-edged discharge port 18 opens through plate 16, with an exemplary diameter of 8.5 mm. One-way only refrigerant vapor flow through port 18 is assured by a conventional, flexible reed, indicated generally at 20. Reed 20 is a thin (0.4 mm), resilient spring steel member which is symmetric to a dotted line length axis A with an effective length of approximately 15.5 mm. A base 22 is riveted to plate 16, and a generally circular tip 24 concentrically overlies the discharge port 18, with a diameter of approximately 11.5 mm. Tip 24 could be straight on the sides, and rounded only at the distal edge, and is in some designs, but works in the same way. A rigid stop 26 of corresponding size overlies reed 20, so that the tip 24 is limited in how far away from the port 18 it can flex when lifting in response to a positive pressure between chamber 12 and 14. A negative pressure differential, in conjunction with the reed 20's own tendency to return to its flat condition, causes it to slap down against the surface of plate 16 to close port 18, passively creating a one-way only flow through port 18. In order to reduce the noise of the reed tip 24, slapping down shut, as well as to reduce the "stiction" resistance to its opening, the surface of plate 16 located below the reed tip 24 and surrounding port 18 is largely recessed by a concentric annular channel 28 having an outer diameter of approximately 13.6 mm, greater than the reed tip diameter 24 of 11.5 mm, and an inner diameter of approximately 10.1 mm, less than the reed tip 24 and approximately 1.6 mm greater than the discharge port 16. Formation of the channel 28 leaves a narrow, annular support seat 30 completely and concentrically surrounding port 16, with a constant radial width W1 of approximately half the diameter difference, or 0.8 mm all the way around. The channel 28 assures that most of the undersurface of reed tip 24 makes no surface contact as it slaps shut, reducing engagement noise. Conversely, the circumferentially complete surface of seat 30 assures complete sealing around port 16, but provides a reduced contact surface area to stick to the undersurface of tip 24 and retard its lifting and opening. The surface area of seat 30 must still be large enough to support the tip 24 against bending or "cupping" as it slaps down, however. Otherwise, reed tip fracture could occur, especially near the distal edge, where the forces and speed of closing are greatest.

Other approaches to reducing sticking include shot peening or other surface treatments and roughening around the edge of the discharge port. However, these are more expensive and difficult to control than the simple expedient of forming an annular channel. While the resulting, constant width annular support seat created by the channel works, it would be desirable to further optimize it, if possible, to further reduce engagement noise and opening resistance, while still providing adequate reed tip support.

SUMMARY OF THE INVENTION

An improved reed valve support seat in accordance with the present invention is characterized by the features specified in claim 1.

In the preferred embodiment disclosed, a conventionally-shaped and sized reed provides the same passive closing and opening of a round discharge port of conventional diameter. An annular channel of conventional shape and size surrounds the discharge port. However, the inner diameter of the channel is nonconcentric relative to the discharge port. The center of the discharge port is displaced, relative to the center of the inner diameter of the channel, in a direction along the length axis of the reed and slightly toward the reed base. This creates a support seat with a continually varying width, greatest at a point lying on the reed length axis and nearest the tip's distal edge, and least at a point diametrically opposed thereto. The greatest seat width is located where the most reed support is needed, nearest the distal edge of the tip, while the seat width is less at every other point. Therefore, the support seat width is optimized in terms of reed tip support, while the surface area is minimized to reduce engagement noise and reduce reed opening resistance.

BRIEF DESCRIPTION OF THE DRAWINGS

These and other features of the invention will appear from the following written description, and from the drawings, in which.

DESCRIPTION OF THE PREFERRED EMBODIMENT

Figure 1:
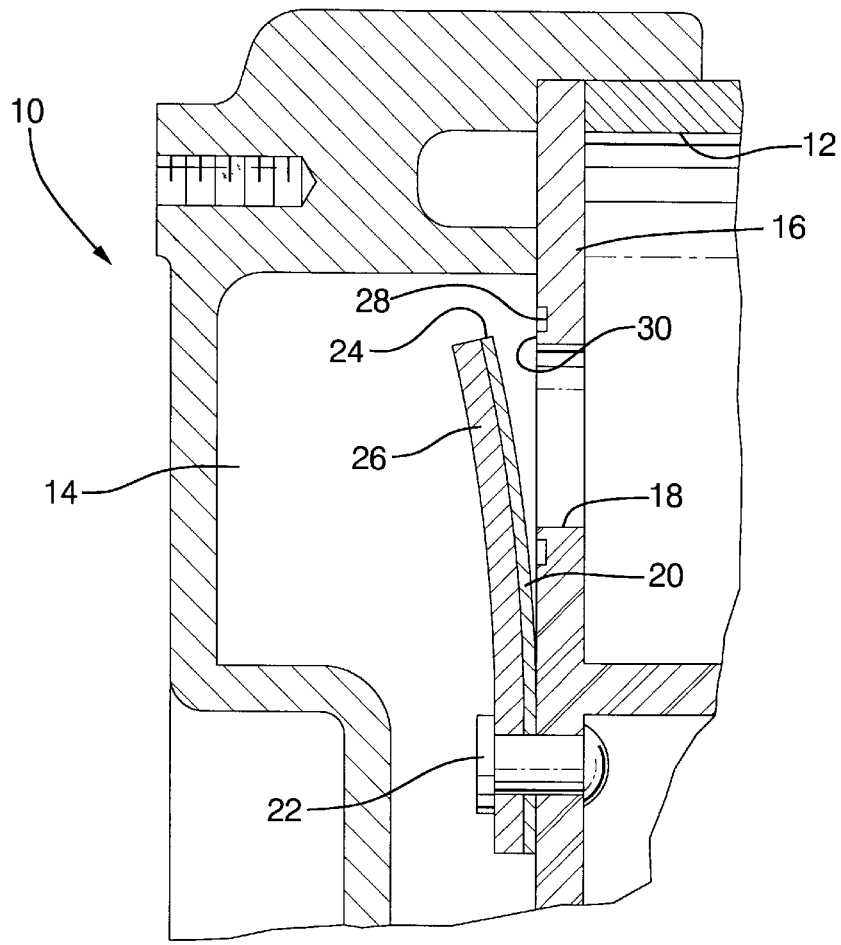
FIG. 1 is a cross section through a conventional reed valve and valve plate, shown in an open position.
Figure 2:
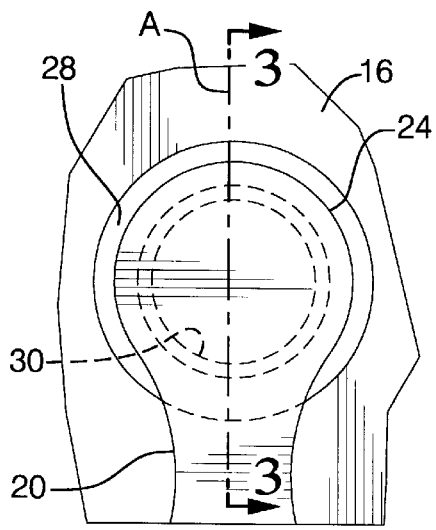
FIG. 2 is a plan view of the reed tip of the reed from FIG. 1, and the proximate surface of the valve plate.
Figure 3:
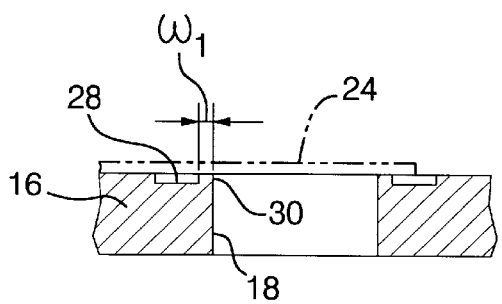
FIG. 3 is a cross section taken along the line 3—3 of FIG. 2.
Figure 4:
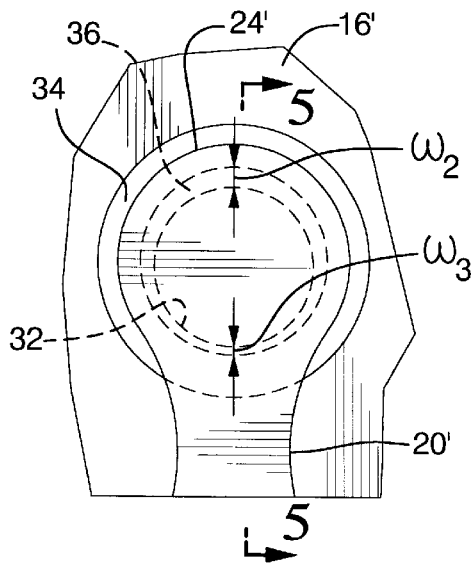
FIG. 4 is a plan view of the tip of a reed like that shown in FIG. 2, but covering a surface of a valve plate that is reconfigured according to the invention.
Figure 5:
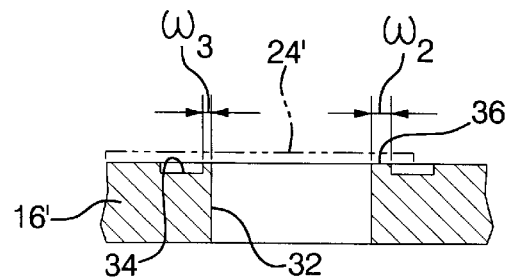
FIG. 5 is a cross section through the discharge port and surrounding valve plate surface taken along the line 5—5 of FIG. 4, showing the closed location of the reed tip in dotted line.

Referring first to FIGS. 4 and 5, an improved reed tip support seat made according to the invention would be incorporated in the same type of compressor 10 described above, and would use the same reed, which is indicated at 20', and the same basic valve plate 16'. What differs is the way in which the discharge port and the valve plate surface surrounding it are relatively configured. In the invention, a round discharge port 32, equal in diameter to port 18, is cut through valve plate 16', but it is not exactly concentric to the reed tip 24'. Instead, as compared to port 18, the center of port 32 is shifted slightly, along the length axis of reed 20', away from the distal edge of tip 24'. A concave channel 34 is formed into the surface, surrounding the port 32, which, like channel 28, is concentric to the reed tip 24', and with the same outer diameter as channel 28. In terms of actual manufacture, the channel 34 would most conveniently be formed first, and the port 32 drill later, in its relatively offset orientation, so that only basic circles would have to be created. Now, however, the inner diameter of channel 34 can be, and is, slightly smaller than channel 28. Now, because of the eccentricity of the discharge port 32 relative to the reed tip 24' (and relative to the channel 34), the reed tip support seat 36 created around port 32 by the channel 34 is not of a constant radial width at every point around its circumference. Rather, as seen in FIG. 5, the width varies continually, from a greatest width W2, located at the "12 o'clock" position, nearest to the distal edge of reed tip 24', to a least width W3, located diametrically opposed to the greatest width. More detail on the varying width of the support seat 36 is given next.

Figure 6:
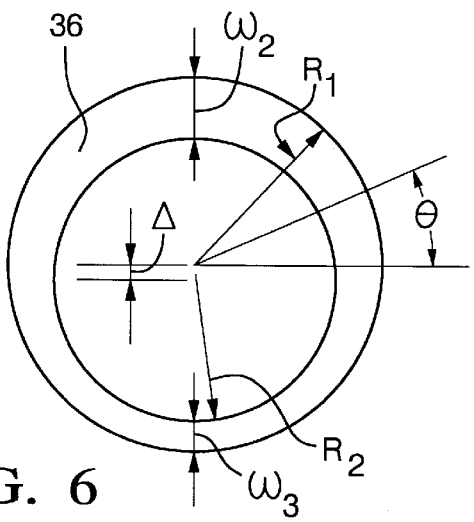
FIG. 6 is a schematic view of the edges of the reed support seat.
Figure 7:
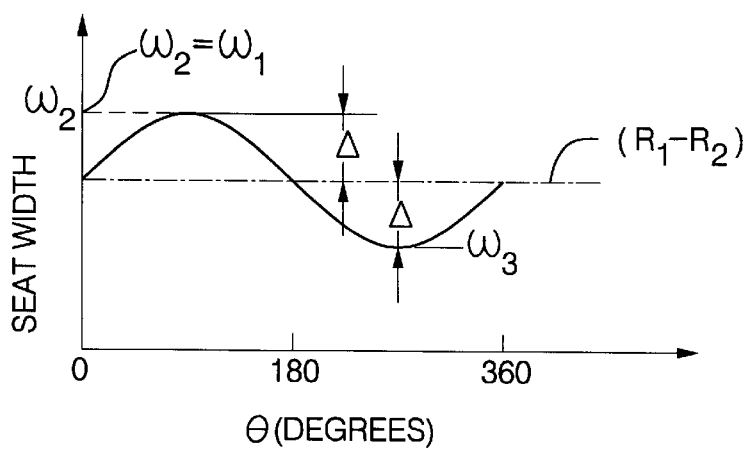
FIG. 7 is a graphical representation of the varying seat width.

Referring next to FIGS. 6 and 7, a geometric and graphical representation of the support seat 36 and how its width varies is presented. While the outer diameter of the channel 34 is equal to that of channel 28, the inner diameter of the channel 34 at 9.78 mm is less than that of channel 28, so that the outer radius of the seat 36 is smaller than for seat 30. Specifically, the outer radius R1 of the seat 36 (half of the smaller inner diameter of the channel 34) is approximately 4.89 mm as disclosed. The inner radius R2 of the seat 36, however, which is equal to half the diameter of the same sized discharge port 32, is the same as seat 30, or approximately 4.25 mm. If the seat 36 had concentric inner and outer edges, then its radial width would be constant at (R1−R2), and smaller than the width of seat 30 all the way around, because R1 is smaller for seat 36. However, because of the offset Δ (which is approximately 0.16 mm as disclosed) between the centers of the two radii R1 and R2, the width of seat 36 varies, and its greatest radial width W2 is greater than (R1−R2) by the amount of the offset Δ, or W2=[(R1−R2)+Δ], which is 0.8 mm to be exact. This is equal to W1, the constant width of prior art seat 30, which is desired at the point that requires the greatest support. Its least radial width W3 is less than (R1−R2) to the same degree, or W3[(R1−R2)−Δ], or 0.48 mm to be exact. In general, by setting the offset Δ between the centers of the two edges of seat 36 to be approximately equal to the degree to which the outer radius of the prior art seat 30 exceeds the inner radius R1 of seat 36 (a 5.05 minus 4.89, or 0.16 mm differential as disclosed), then the greatest radial width W2 of the seat 36 will be at least equal to the constant radial width W1 of the new seat 30, or 0.8 mm. Since the rest of seat 36 is everywhere narrower than W2, and therefore everywhere narrower than seat 30, its total surface area is less than seat 30. The exact variance of the width of seat 36 as a function of any angular point θ around its circumference is indicated graphically in FIG. 7. Generally, the width varies in sinusoidal fashion, being greatest at the point closest to the distal edge of reed tip 24' and least at the point diametrically opposed thereto. More specifically, the seat width varies up or down by Δ from a base width of (R1−R2). However, the base width (R1−R2) is less than for seat 30, since the outer edge radius R1 of seat 36 is less than for seat 30.

To summarize and conclude, the greatest width of the varying radial width of seat 36 is at least equal to the constant, basic seat width of the prior art support seat 30. Since seat 30 was wide enough (W1) to adequately support the reed tip 24 at the point where it needed the most support, that is, nearest the distal edge of the reed tip 24, it was, in effect, wider than necessary everywhere else. That extra width translates into extra surface area, added engagement noise and potentially greater stiction. The reed tip support seat 36 of the invention, by contrast, while wide enough to support the reed tip 24' at the point where most support is needed (W2=W1), is narrower everywhere else. Moreover, that decrease in width from the twelve o'clock to the six o'clock position is continual and smooth, with no abrupt transitions. The overall surface area of seat 36 is reduced, as are engagement noise and the potential for stiction. This improvement is gained with no change in the number of components or their basic dimensions, and with minimal change in method of manufacture.

Variations in the embodiment disclosed could be made. As noted, the reed tip need not be circular, and is often straight on the sides, being simply an extension of a constant width reed with only the distal edge being rounded off. Such a reed tip would still have a predetermined width, and the recessed channel would still have an outer and inner width related to that reed tip width. The support seat, most broadly considered, need only have a varying radial width with the greatest width located in the optimum location, that is, nearest the distal edge of the reed tip, and with a reduced radial width elsewhere, so as to reduce total area in contact. The two nonconcentric circular edges, being the circular inner edge of the annular channel 34 and the circular edge of the discharge port 32, are a preferred way of providing a substantially annular support seat, the radial width of which varies in the manner desired. In the embodiment disclosed, the reed tip 24', being circular, is oriented basically concentric to the channel 34, and it is the port 32 is that is formed offset relative to the channel 34 and reed tip 24' and shifted by Δ away from its original location. While the channel 34 and the port 32 must keep the relatively offset relationship that they have in order to create the variable width seat 36, the reed 20' could be attached to plate 16' so as to put the reed tip 24' concentric to the port 32, rather than concentric to the channel 34, or concentric to neither, so long as the reed tip 24' covered the seat 36 completely and fairly evenly. In the interests of an easy retrofit to existing designs, however, it would be most convenient to attach reed 20' in exactly the same relative location on plate 16' as reed 20 has on plate 16. As disclosed, the inner edge of channel 34 is smaller than channel 28, so that the inner edge radius R1 of seat 36 is less than the comparable radius for seat 30. However, the two channels 34 and 28 could be made equal sized. With the offset Δ, however, the result would be that the greatest width W2 of seat 36 would now be somewhat greater than the equivalent constant width W1 of seat 30, rather than just equal. While this would not decrease total seat surface area, it would still distribute the seat width more efficiently around the circumference of the seat and could actually improve reed tip support in the most critical area of the support seat. Therefore, it will be understood that it is not intended to limit the invention to just the embodiment disclosed.

We claim:

1. In an air conditioning compressor (10) having a flexible reed (20') extending along a length axis from a fixed base to a movable tip (24') of predetermined width that overlays a smaller, substantially circular refrigerant port (32) formed through a flat valve plate (16'), a reed tip support seat (36) formed from said valve plate (16'), comprising, a concave channel (34) formed in the surface of said valve plate (16') surrounding said refrigerant port (32) and having an outer width greater than the width of said reed tip and an inner width smaller than the width of said reed tip (24'), and a substantially annular support seat (36) surrounding said port (32) flush with said valve plate and formed by the inner width of said concave channel (34) and said port (32), said seat having a radial width that varies continually from a greatest width located nearest the distal edge of said reed tip (24') that is sufficient to provide adequate sealing support to said reed tip (24') to a least width substantially diametrically opposed to said greatest width, so as to reduce engagement noise with said reed tip (24').

2. A reed tip support seat (36) according to claim 1, further characterized in that said concave channel (34) is substantially annular, with an inner diameter that is less than said reed tip (24') width and which is also nonconcentric to said port (32) and displaced from the center of said channel (34) inner diameter in a direction away from the distal edge of said reed tip (24'), so as to create a substantially annular support seat (36) of continually varying radial width.

3. A reed tip support seat (36) according to claim 2, further characterized in that said reed tip (24') is generally circular in shape and substantially concentric to said concave channel (34).

* * * * *